United States Patent [19]

Matherat

[11] 4,311,998

[45] Jan. 19, 1982

[54] VECTOR GENERATOR FOR A GRAPHIC CONSOLE

[75] Inventor: Philippe Matherat, Paris, France

[73] Assignee: Thomson-CSF, Paris, France

[21] Appl. No.: 39,259

[22] Filed: May 16, 1979

[30] Foreign Application Priority Data

May 18, 1978 [FR] France ............................... 78 14766

[51] Int. Cl.[3] ............................................... G06F 3/14

[52] U.S. Cl. .................................... 340/731; 340/739; 340/741

[58] Field of Search ............... 340/731, 804, 739, 740, 340/741, 742

[56] References Cited

U.S. PATENT DOCUMENTS 3,471,847 10/1969 McCollough et al. ............ 340/742

3,938,130 2/1976 Burnham et al. .................. 340/804

*Primary Examiner*—Marshall M. Curtis

*Attorney, Agent, or Firm*—Roland Plottel

[57] ABSTRACT

A vector generator for producing graphic images composed of line segments, having a discrete frequency multiplier 60 which comprises initializing means, stopping means and means for punctuating the drawing of the segments; input means for the M and N components of the segment, and a writing pointer 50 in an image memory 20.

The invention may be used in graphic consoles and X, Y-plotters.

7 Claims, 35 Drawing Figures

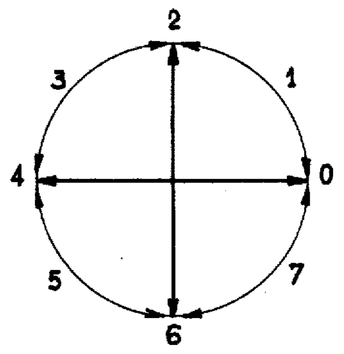
FIG_6a
| N° | CODE | M | N |
|---|---|---|---|
| 0 | 000 | ⩾0 | = 0 |
| 1 | 001 | ⩾ 0 | ⩾ 0 |
| 2 | 010 | = 0 | ⩾ 0 |
| 3 | 011 | ⩽0 | ⩾ 0 |
| 4 | 100 | ⩽0 | = 0 |
| 5 | 101 | ⩽0 | ⩽0 |
| 6 | 110 | = 0 | ⩽ 0 |
| 7 | 111 | ⩾ 0 | ⩽ 0 |
FIG_6b
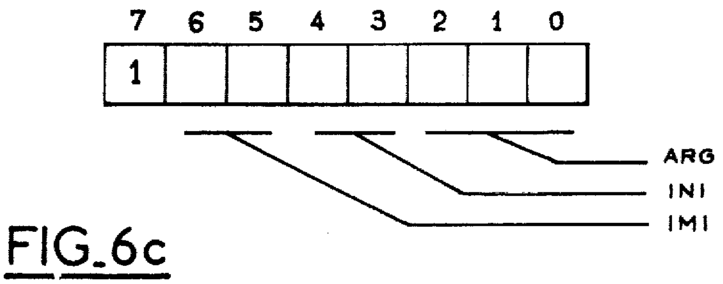
FIG_6c

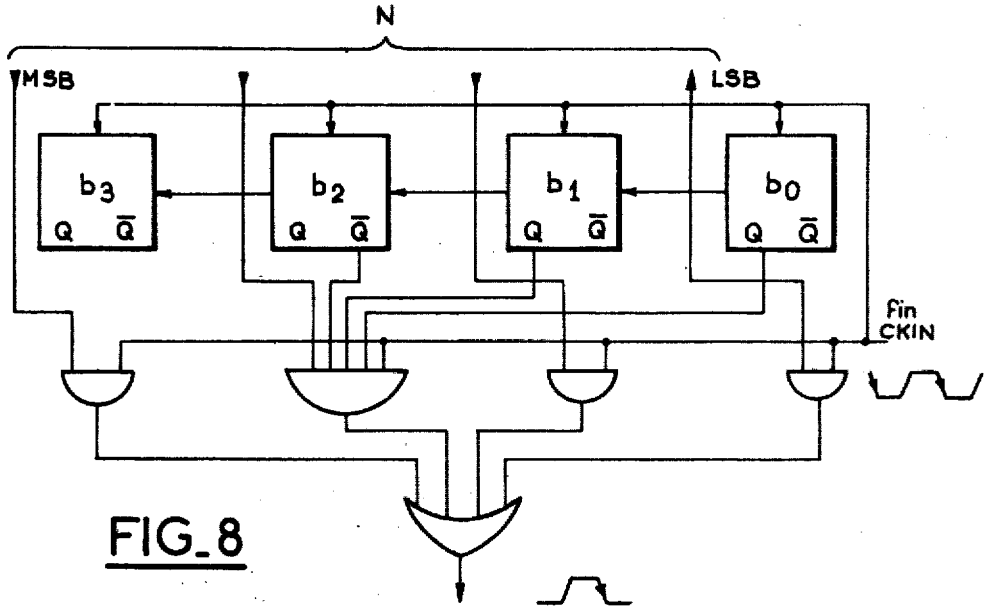
FIG_8
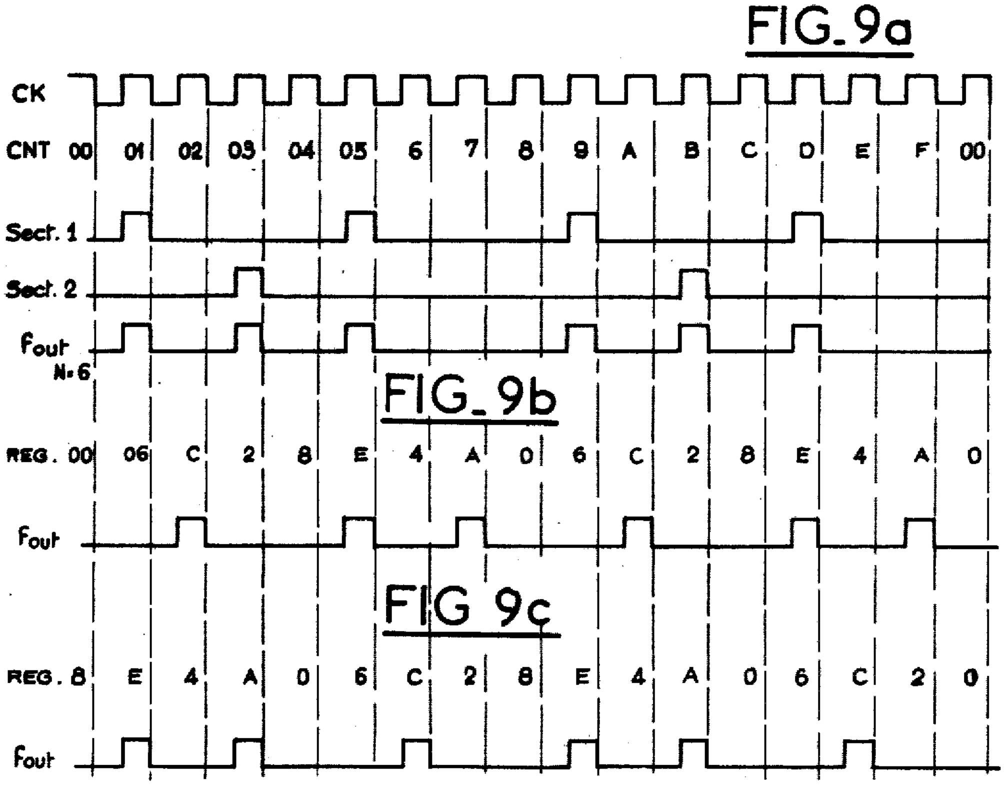
FIG_9a
FIG_9b
FIG 9c

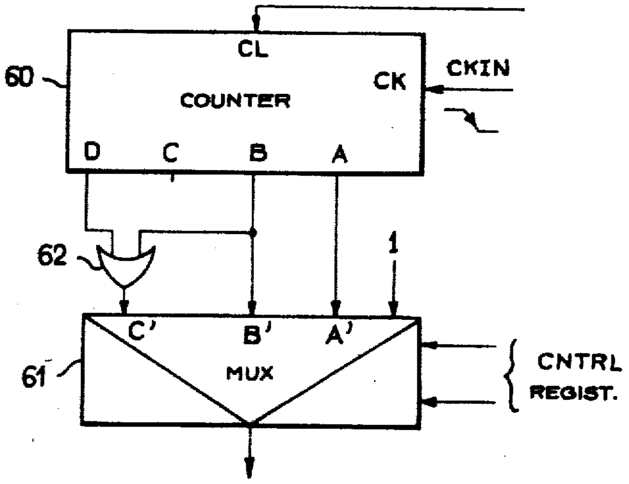
FIG. 22a
FIG. 22b
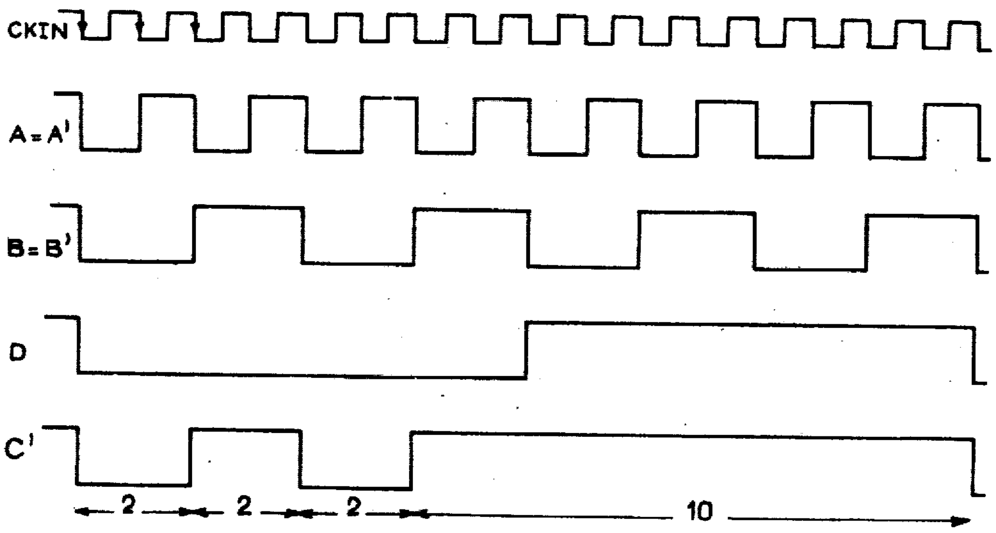
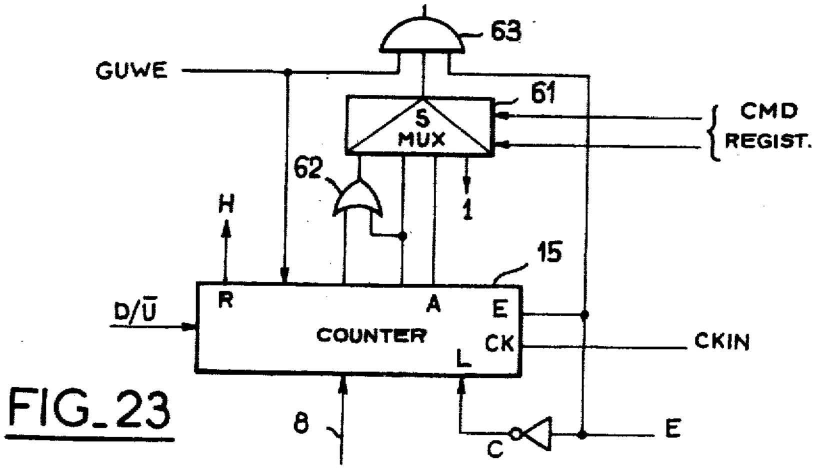
FIG. 23

VECTOR GENERATOR FOR A GRAPHIC CONSOLE

This invention relates to the technical field of graphic terminals. More particularly, the invention relates to a signal generator for drawing vectors of predetermined direction and length.

Information systems which enable a graphic image composed of geometric figures, alphanumeric characters and various symbols to be displayed on a screen are known in the art as graphic terminals. A graphic terminal comprises in particular a display console generally equipped with a cathode ray tube (CRT). Display consoles are divided into two classes according to the method by which the screen is scanned: one of these classes includes consoles equipped with a cathode ray tube having an intrinsic screen memory screen in which the data comprising the image are directly recorded by a so-called "random" scan, whilst the other class includes consoles equipped with a low-persistence cathode ray tube which means that the data of the image are stored in a memory unit which is read repetitively at a high rate by a "television" scan in order to avoid flickering of the image displayed on the cathode screen. The present invention relates more particularly, but not exclusively, to this second class of display console. Display consoles are described in the literature, particularly in P. MORVAN'S book entitled "Images et Ordinateurs", published by LAROUSSE, PARIS, 1976.

In addition to the graphic TV console and the memory unit, also known as the "image data storage and refresh memory", a graphic terminal comprises a control unit for reading and displaying the content of the memory unit and for synchronising the TV scan of the console; a graphic unit for producing the data of the image and recording them in the memory unit; dialogue tools, such as a light pen, a keyboard, etc. The terminal thus formed is connected to a control unit, such as a microprocessor (MPU) or to a computer.

The graphic unit, also known in the technical literature as a "graphic function generator", generally comprises a character generator and a vector generator connected to a single writing pointer in the image memory. The present invention as described hereinafter relates to the vector generator.

The subject of the invention is a generator which enables oriented line segments (vectors) to be digitally drawn with a minimal quantization error.

The invention also relates to a generator which enables different types of lines (continuous, dotted, etc. . . . ) to be drawn.

The invention relates to a generator which enables different types of vectors to be drawn: short vectors specified by an 8-bit byte, long vectors specified by a word of three octets and vectors oriented to "preferential directions" corresponding for example to the principal axes of the graphic image.

According to one aspect of the invention, the vector generator uses a discrete frequency multiplier of the "N-tuple" counter type which comprises a first means for forming a modulo M N-tuple counter where M and N are the projections of the vectors on the axes X and Y of the graphic image.

According to another aspect of the invention, the rate at which a vector is drawn is constant.

According to another aspect of the invention, the drawing of a vector may be interrupted and resumed at any time.

According to another aspect of the invention, an already drawn vector may be erased solely by modifying the recording mode in the image memory.

The vector generator according to the invention comprises a modulo M N-tuple counter comprising initializing means, stopping means and means for permutating the input and output signals according to the order of the values M and N and means for punctuating the drawing of the lines.

Other features and advantages afforded by the invention will become apparent from the following description which, in conjunction with the accompanying drawings, describes purely by way of non-limiting example one embodiment of the invention. In these drawings.

Figure 5A:
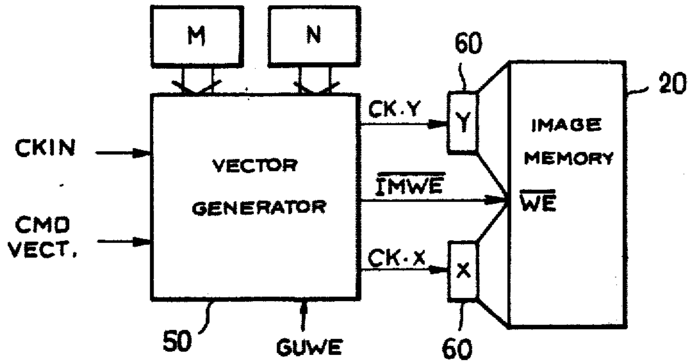
Figure 5B:
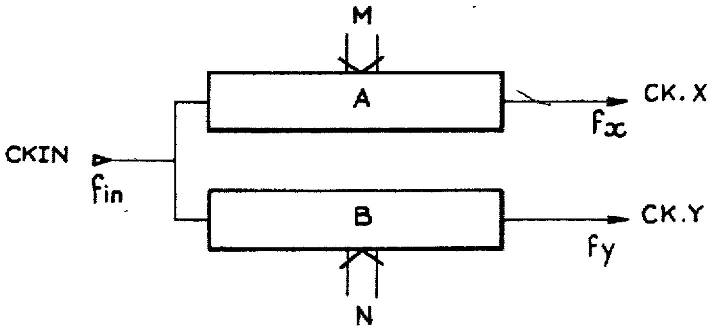

FIGS. 5*a* and 5*b* show the essential means of a vector generator and the equivalent symbolic diagram.

FIGS. 6*a*, 6*b*, and 6*c* show the format of a word corresponding to a short vector and to the direction code of the vector.

Figure 7:
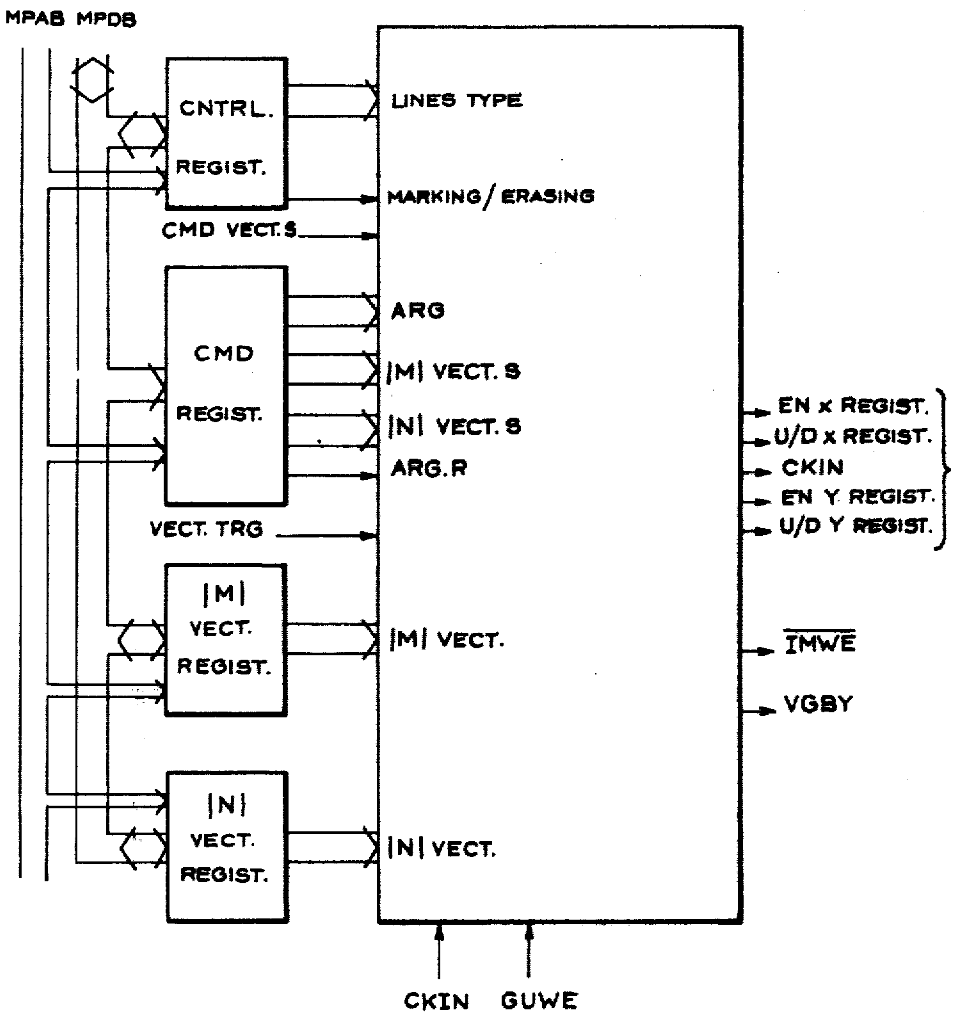

FIG. 7 shows the principal elements associated with the vector generator.

FIG. 8 diagrammatically illustrates a frequency multiplier of the "BRM" type.

FIGS. 9*a*, 9*b* and 9*c* show the chronograms of the signals associated with the frequency multipliers of the "BRM" and "N-tuple" type.

Figure 10A:
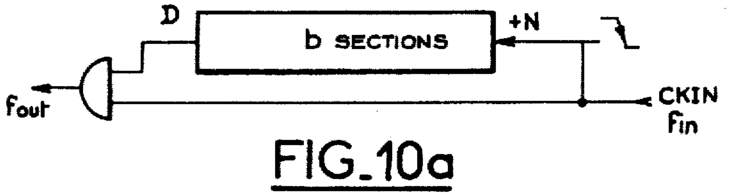
Figure 10B:
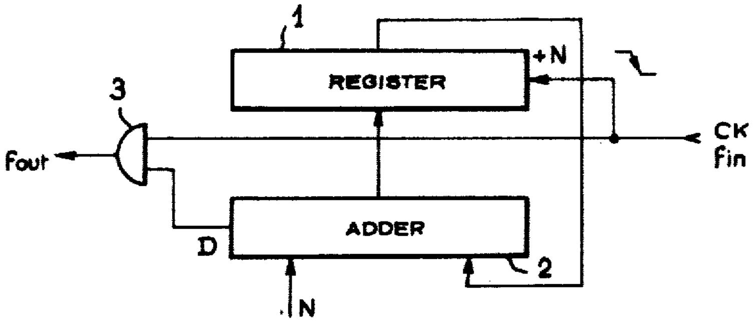

FIGS. 10*a* and 10*b* diagrammatically illustrate an "N-tuple" counter.

Figure 11:
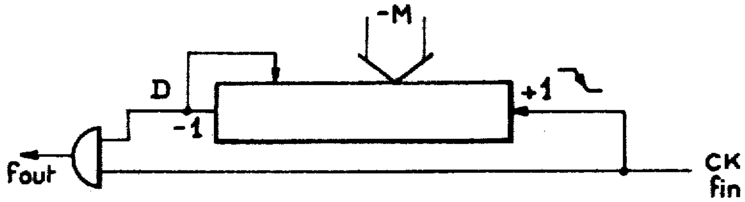

FIG. 11 shows a modulo-M counter in symbolic form.

Figure 12:
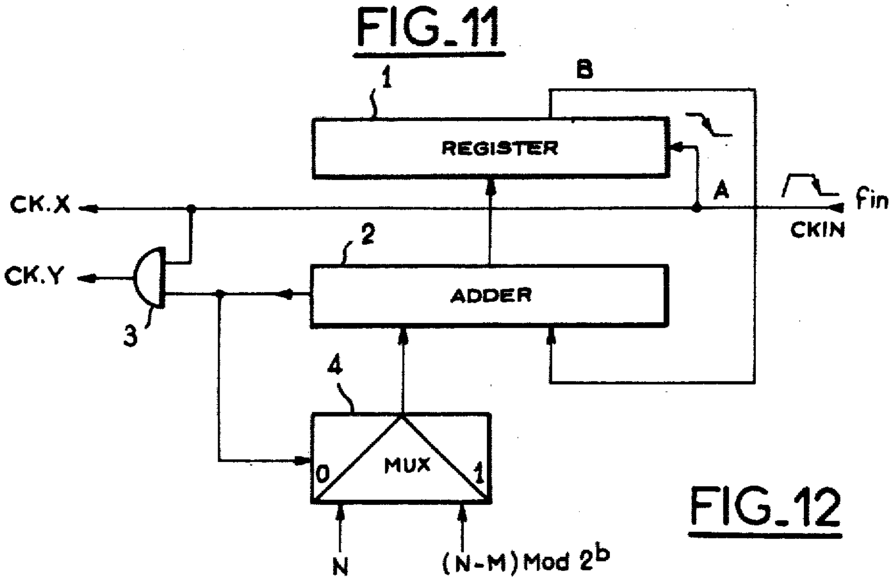

FIG. 12 diagrammatically illustrates a modulo M N-tuple counter.

Figure 13A:
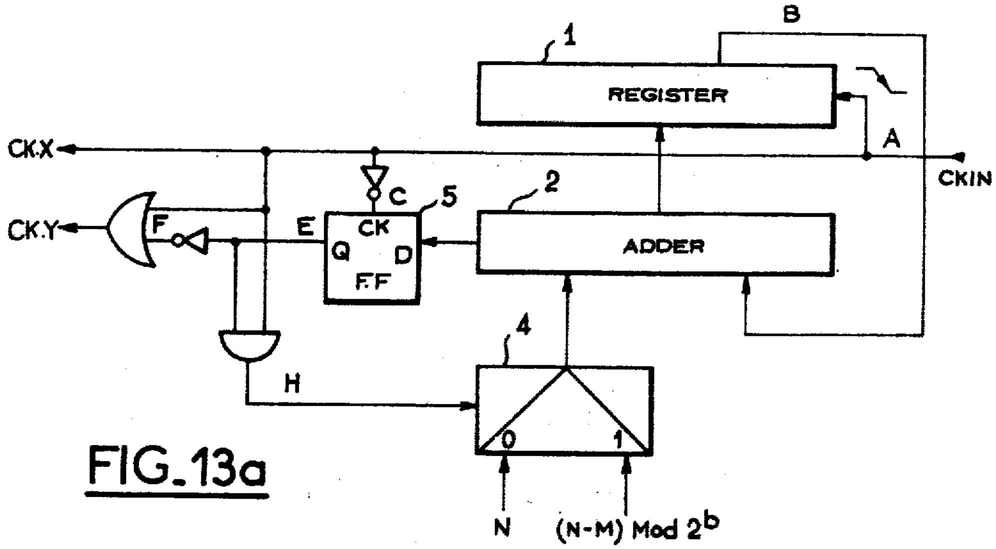
Figure 13B:
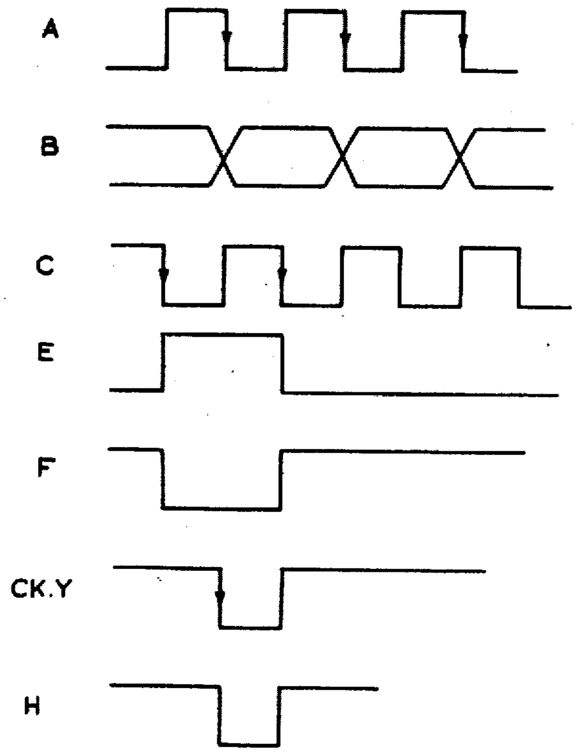

FIGS. 13*a* and 13*b* show one embodiment of a modulo M N-tuple counter.

Figure 14:
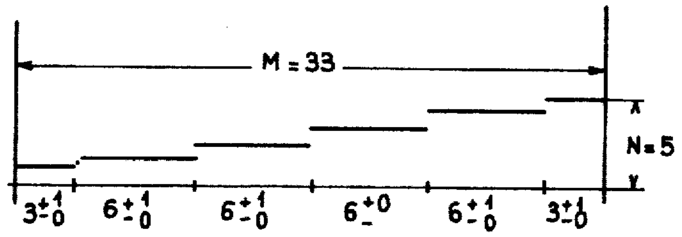

FIG. 14 shows a vector of components M=33 and N=5.

Figure 15:
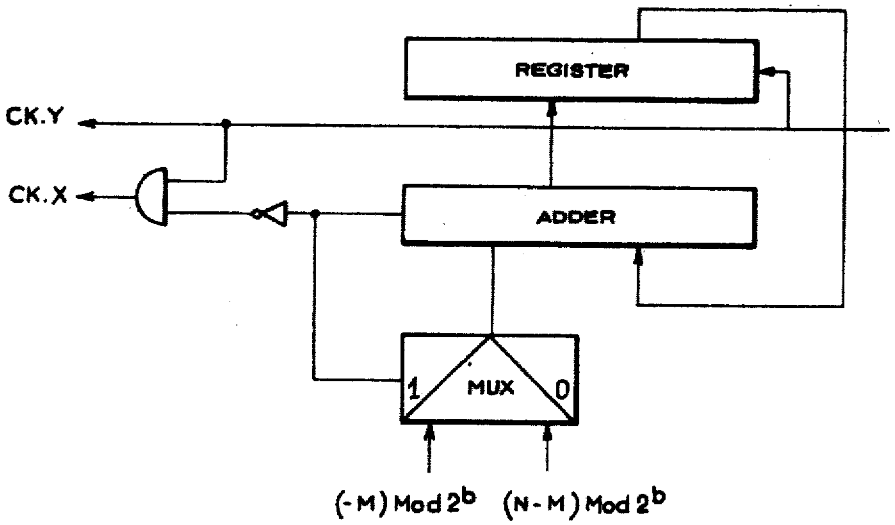

FIG. 15 diagrammatically illustrates a modulo M N-tuple counter.

Figure 16:
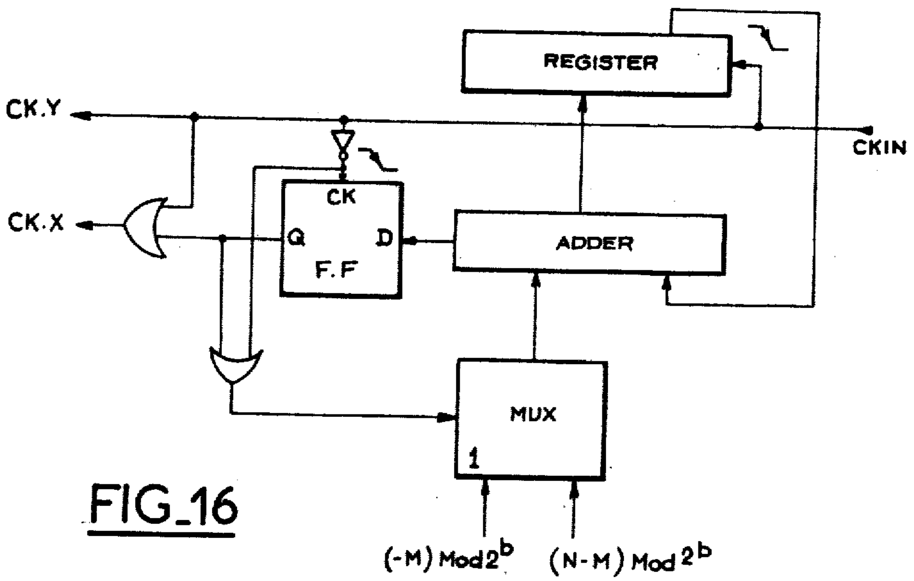

FIG. 16 shows one embodiment of a modulo M N-tuple counter.

Figure 17:
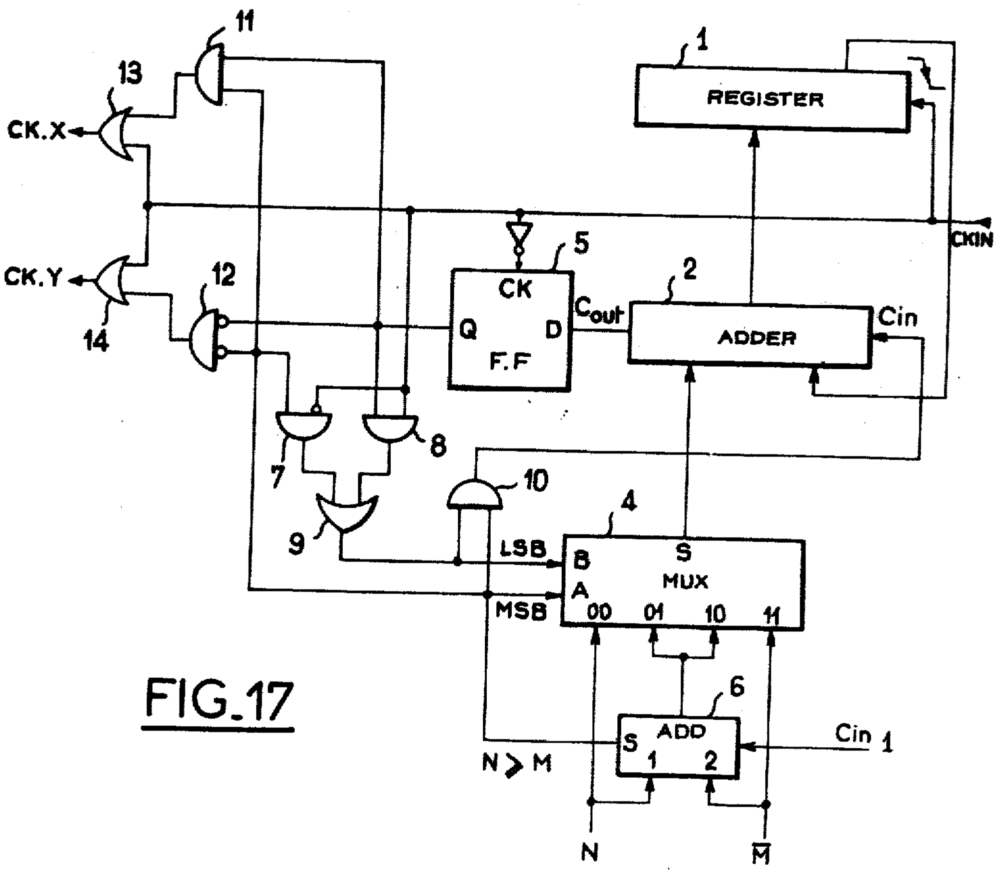

FIG. 17 diagrammatically illustrates the combination of the counters shown in FIGS. 13 and 16.

Figure 18A:
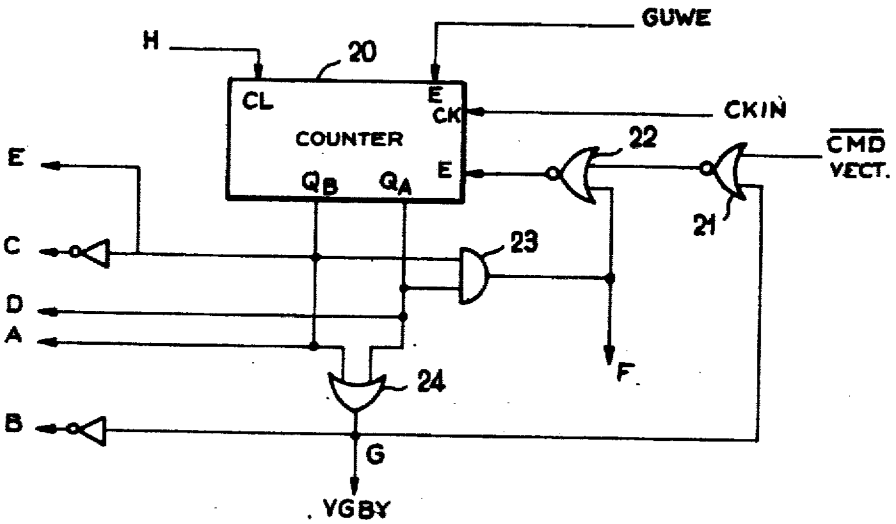
Figure 18B:
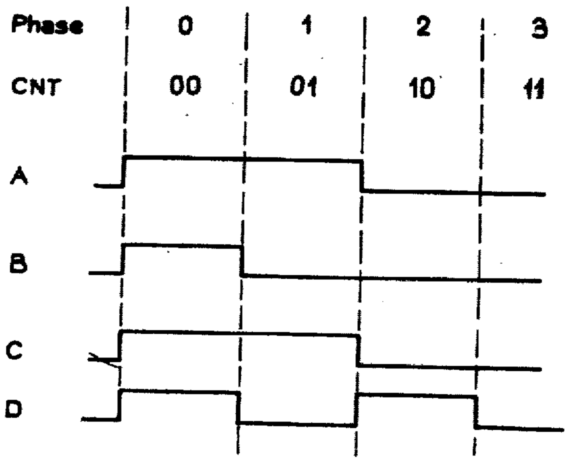

FIGS. 18*a*, and 18*b* show a device for initializing the vector generator.

Figure 19:
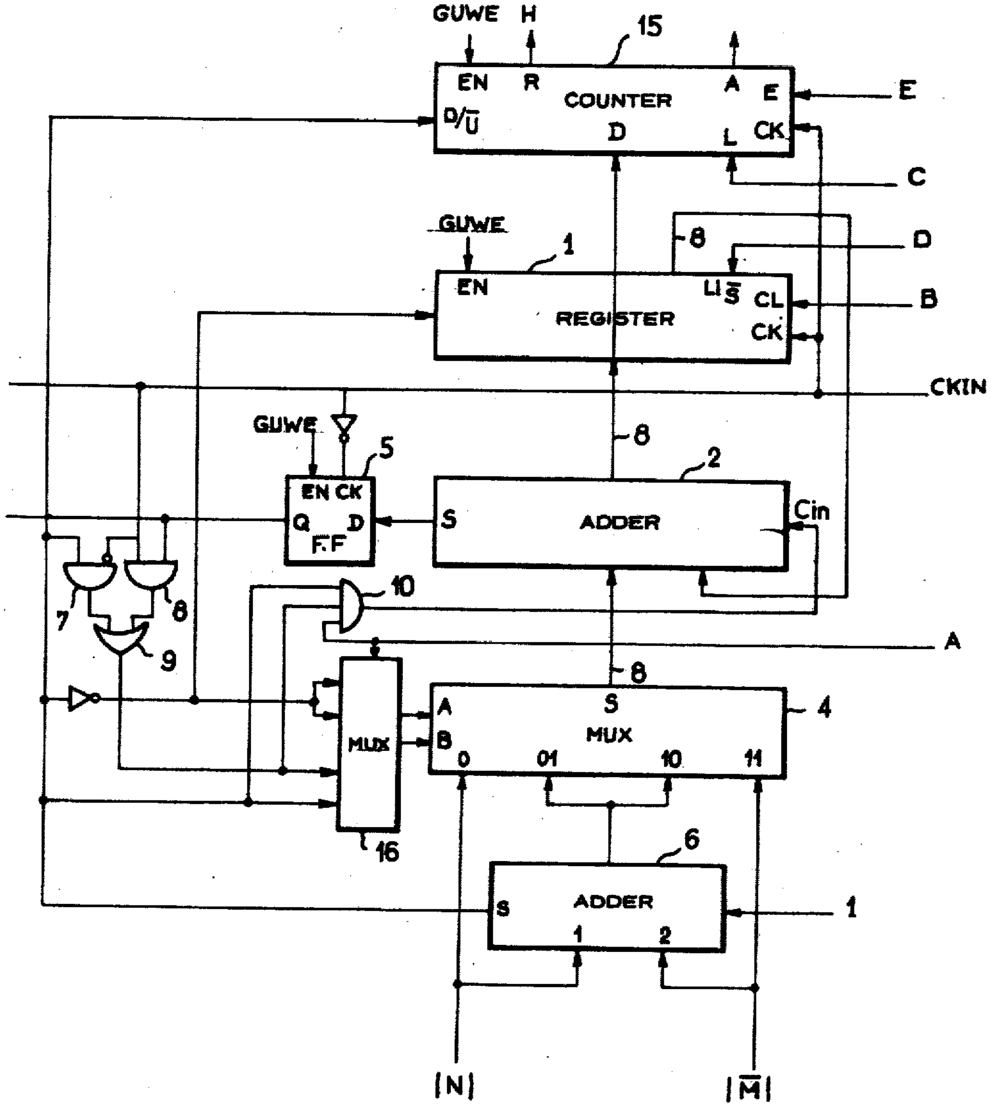

FIG. 19 shows the addition of a means for stopping the drawing of a vector.

Figure 20:
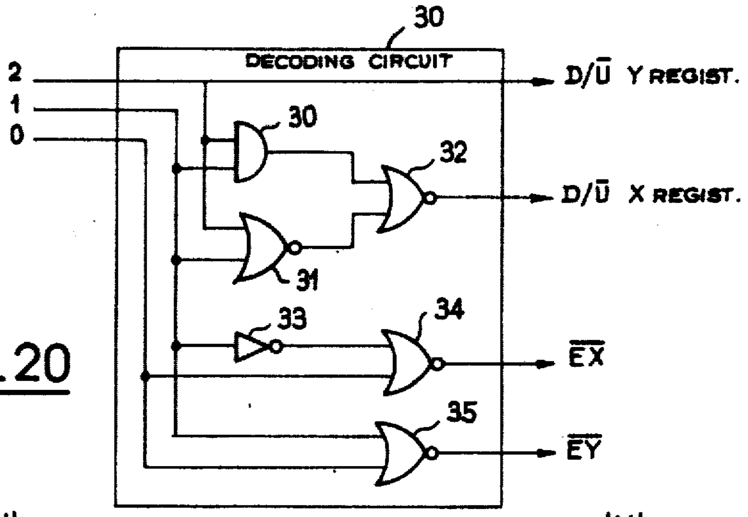

FIG. 20 shows the logic means for decoding the direction code of a vector.

Figure 21:
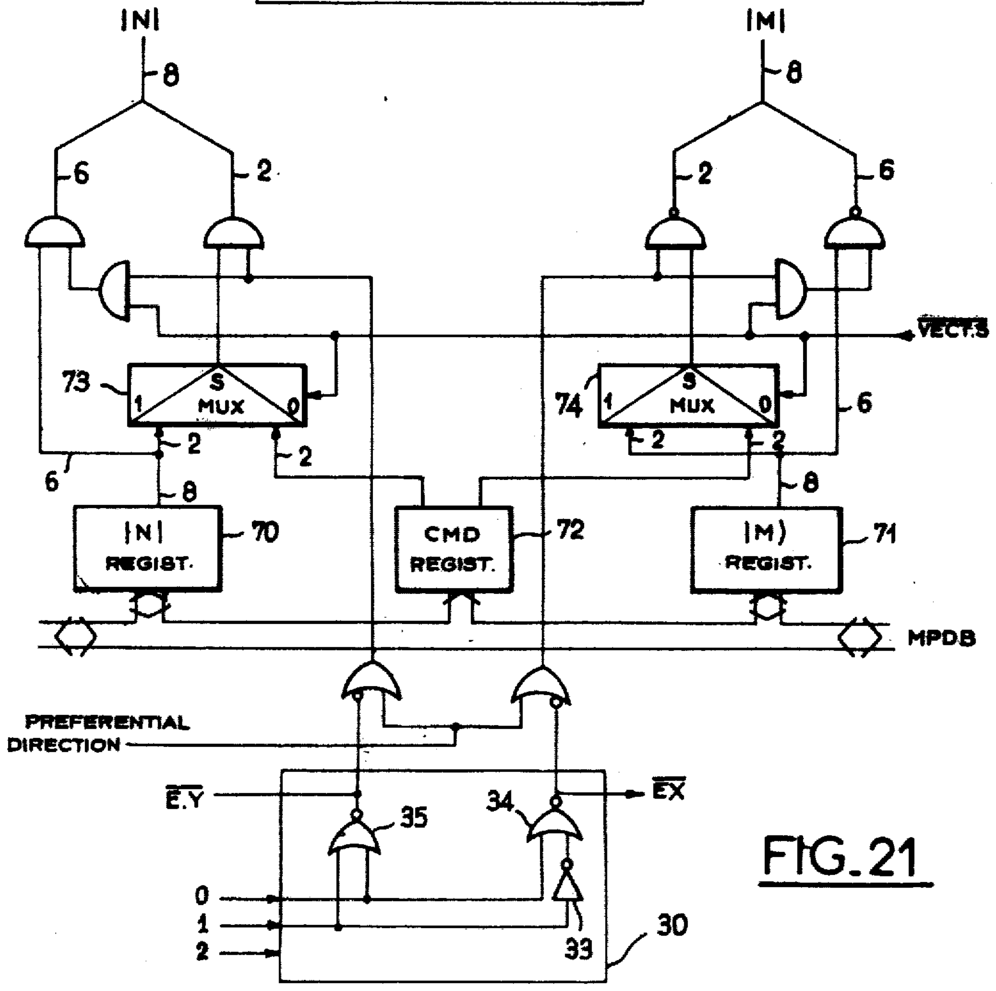

FIG. 21 diagrammatically illustrates the means by which data are fed into the vector generator.

FIGS. 22*a* and 22*b* show a means for punctuating the drawing of a vector. FIG. 23 shows the addition of a means for punctuating a vector in the vector generator.

Figure 24:
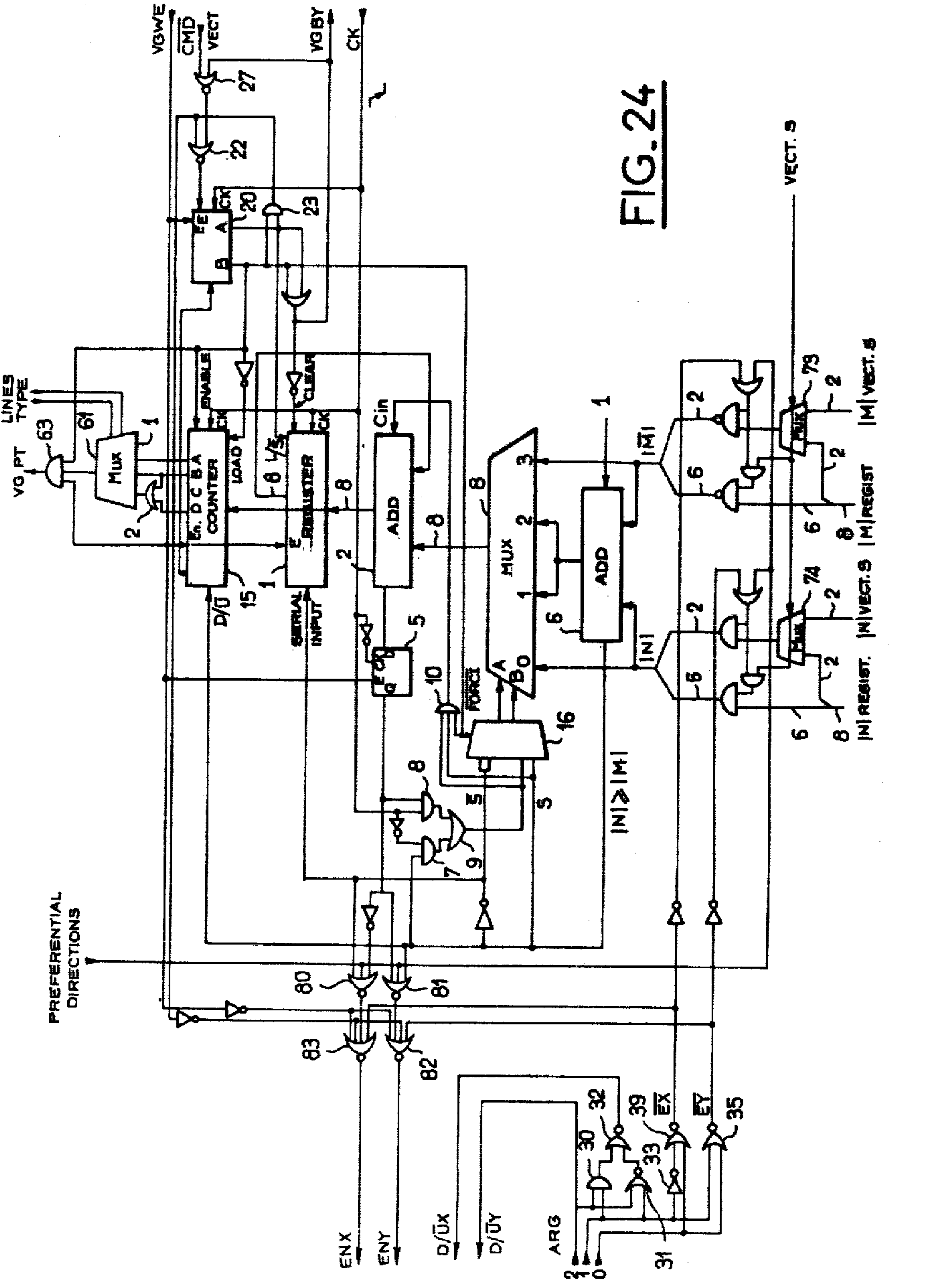

FIG. 24 shows the logic diagram of a complete vector generator.

Figure 25:
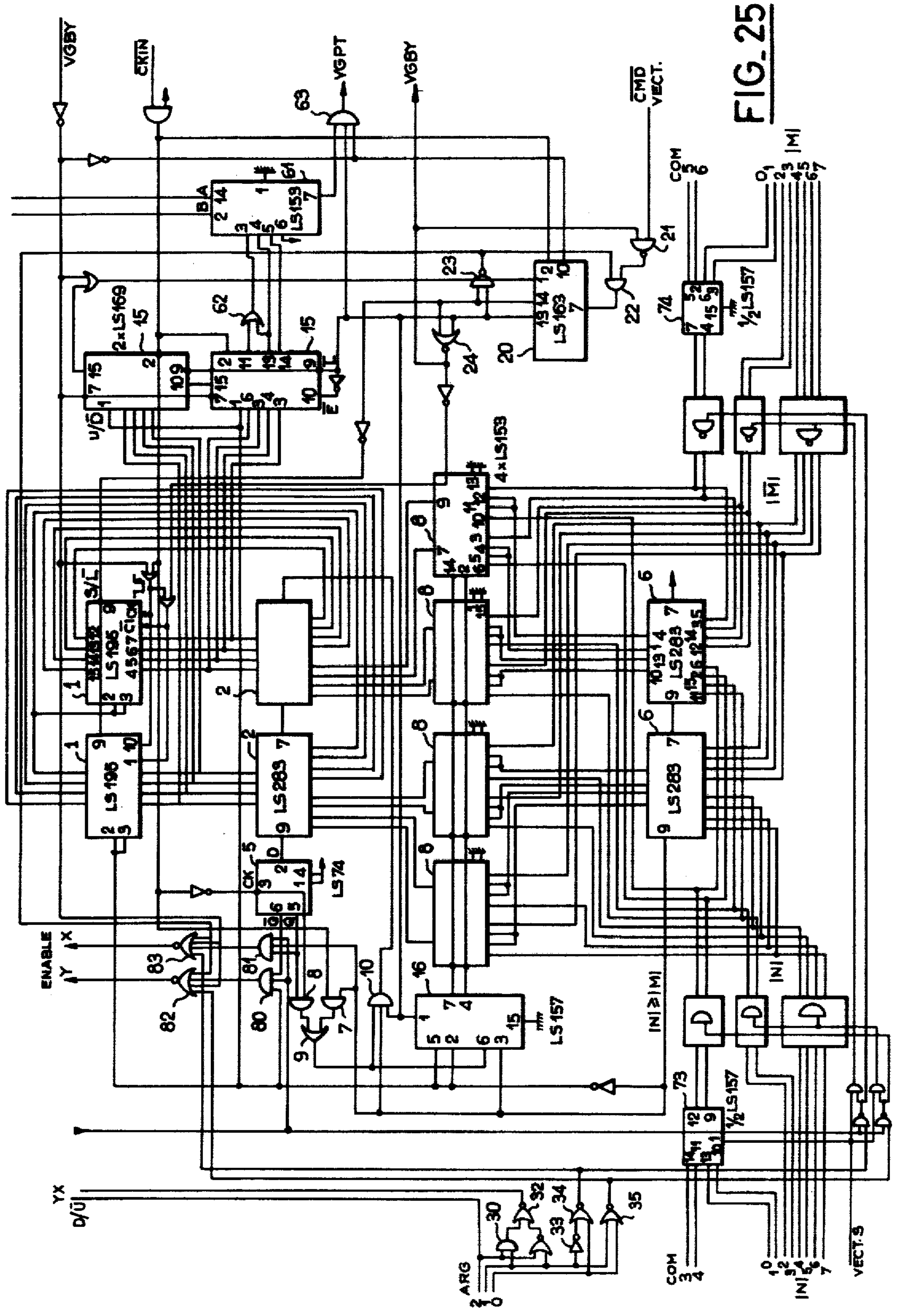

FIG. 25 shows one embodiment of the vector generator in the form of a circuit diagram.

Figure 26:
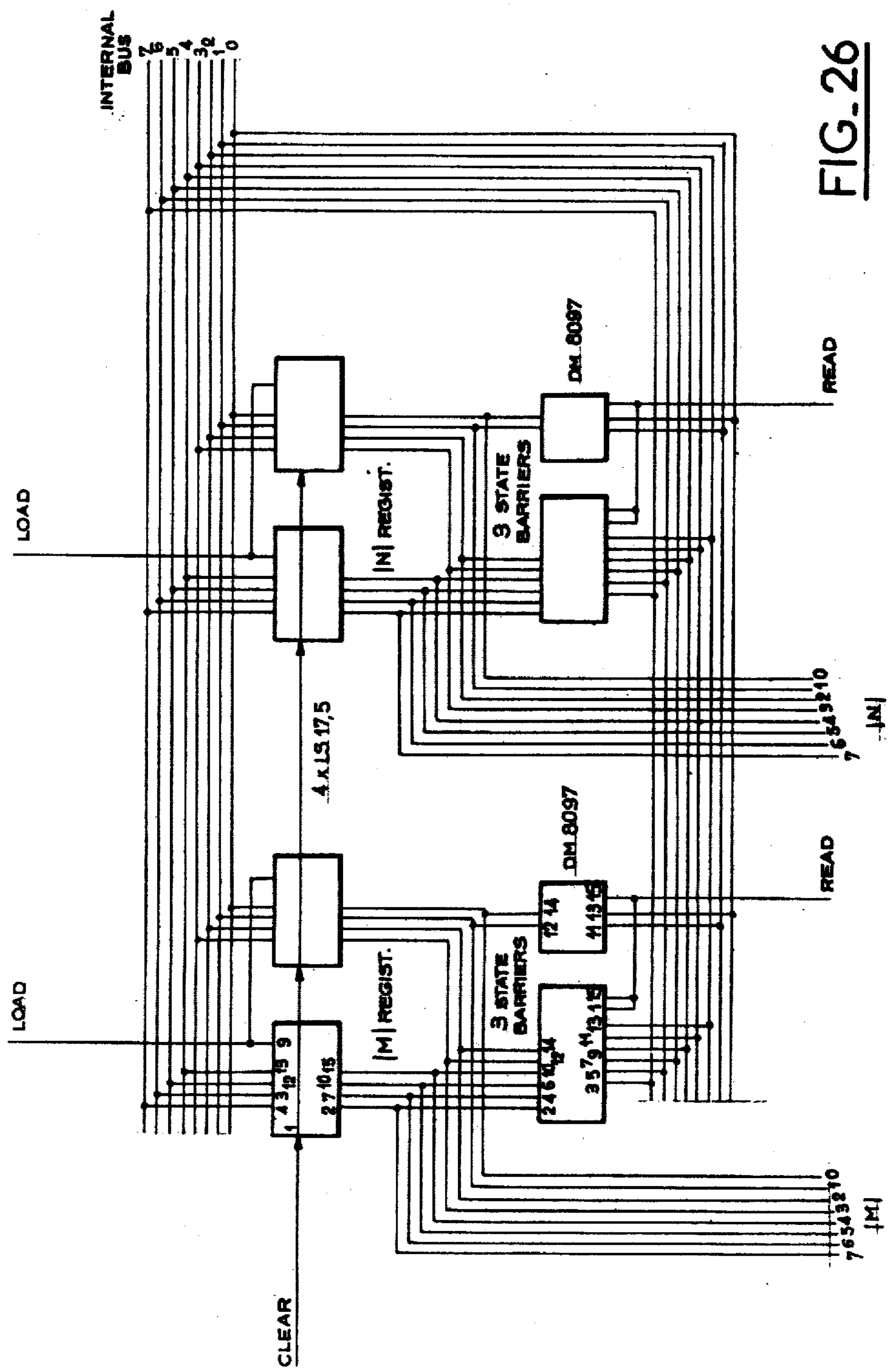

FIG. 26 shows one embodiment of the registers for recording the M and N components of the vectors.

Table 1 shows one example of allocation of the code words of the vectors.

Figure 1:
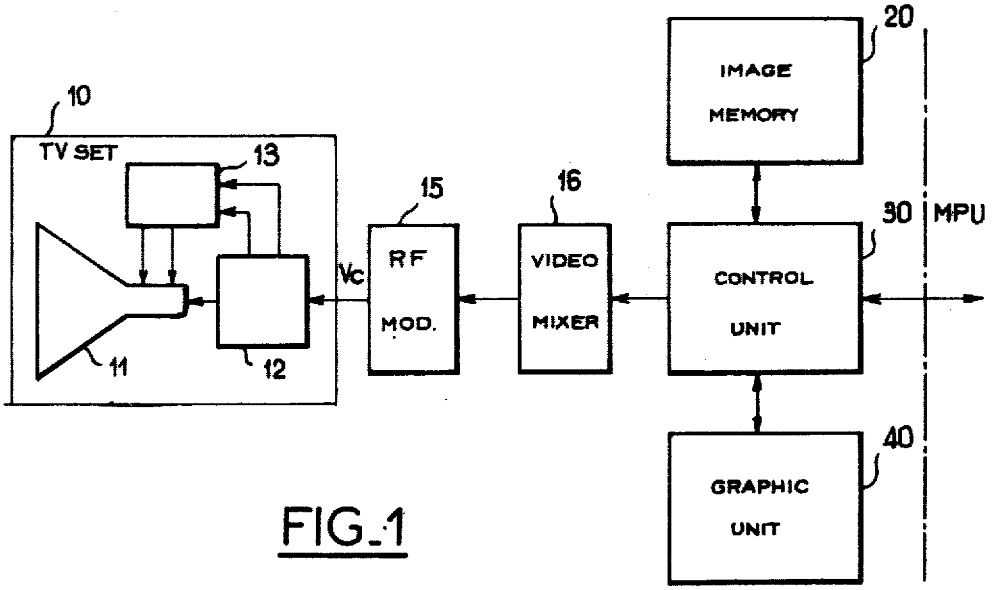
FIG. 1 shows in a modular form the principal elements involved in the construction of a graphic terminal.

The following describes a vector generator which is connected to a graphics console equipped with a low-persistence cathode ray tube which requires an image memory in which the data comprising the drawn vector are recorded in the form of dots. Numerous specific details relating to the vector generator, such as the counters, the registers and the adders, will not be described because they are known in the art and would complicate the description and obscure the novel features of the generator. Equally, however, it is understood that a certain number of details which are described, for example the formats of the words, have been included in order to explain the new features of the generator and that they are not specifically necessary for carrying out the invention. FIG. 1 shows in a modular form the principal elements involved in the construction of a graphic terminal of the TV type. This terminal, which is connected to a control unit, for example a microprocessor (MPU), comprises:

- a TV set 10, such as a standard television receiver, comprising a cathode ray tube 11 of the monochrome or colour type, an amplifier/demodulator 12 which delivers on the one hand a video signal to the cathode ray tube and, on the other hand, line and frame synchronizing pulses (SYNC) to a circuit 13 which generates signals for deflecting the electron beam. At its input, this set receives a composite video signal (VC), or a modulated radiofrequency carrier wave:
- a radio frequency (RF) modulator 15 being necessary in this latter case, this element being optional if the TV set is equipped with a direct video input;
- a video mixer 16, this element also being optional if the TV set is a TV monitor equipped with separate SYNC and VIDEO inputs;
- a modular image memory 20 made up of standard memory modules (packages) of the RAM (random access memory) type in which the data comprising the image are recorded;
- a control unit 30 for generating signals for synchronizing the TV set, reading address signals for the memory unit, signals for controlling the luminance of the screen of the cathode ray tube; this unit also enables the exchange of various signals between the units to be controlled;
- a graphic function generator or graphic unit 40 which enables the graphic image to be drawn and which comprises in particular a generator for drawing vectors;
- various other accessories (not shown in the Figure), such as a light pen, keyboard, graphic tablet, etc.

The control unit and the graphic unit operate on a time-multiplex basis in two modes, namely a reading-/display mode of the memory unit and a writing mode in which the image data are written into the memory unit.

Figure 2:
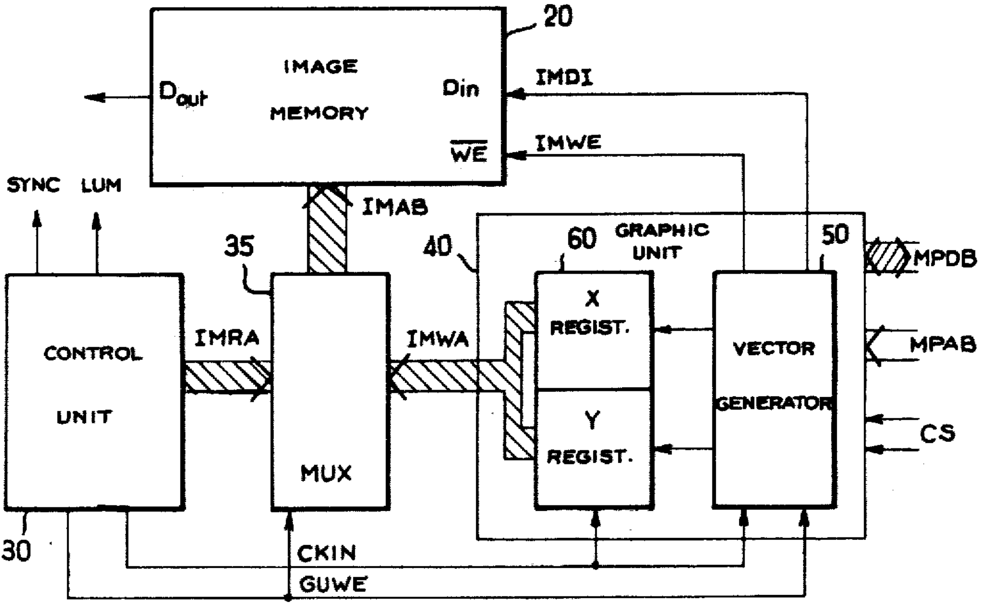
FIG. 2 shows the principal connections between the vector generator and the other elements.

FIG. 2 shows the principal connections between the vector generator and the other elements. The graphic generator 40 comprises two essential elements, namely the vector generator 50 and the writing pointer 60 for the memory unit 20 or memory IM. The writing pointer comprises two registers, namely an X register (X REGIST) and a Y register (Y REGIST) which, on the one hand, may be loaded at a given address and, on the other hand, incremented or decremented by output signals of the writing generator. As mentioned above, the vector generator 40 and the control unit 30 operate on a time-multiplex basis. To this end, the address outputs of these elements are applied to a multiplexer 35. The control unit delivers in particular a timing clock signal CKIN for the writing generator and a signal GUWE which authorizies the operation of the writing generator outside the image data display period. At the same time, this signal GUWE controls the multiplexer 35.

From the control unit (MPU), the vector generator receives data signals on a two-way data bus MPDB, address signals on an address bus MPAB and control or exchange signals on the connections CS. The vector generator delivers writing address signals IMWA for the image memory 20, a signal $\overline{\text{IMWE}}$ for validating a writing operation in the image memory and a signal IMDI for the data entering the image memory. The control unit 30 delivers reading address signals IMRA for the image memory, signals SYNC for synchronizing the TV scan and signals LUM for controlling the luminance of the CRT screen.

The signals IMAB of the multiplexed addresses are delivered to the image memory 20.

Figure 3:
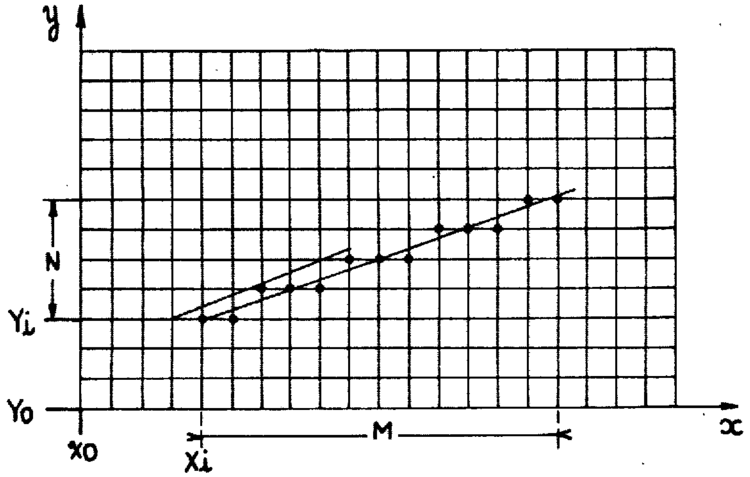
FIG. 3 shows the grid enabling a line segment to be drawn.

FIG. 3 shows a part of the graphic image which is formed from a series $\epsilon$ of $n^2$ dots situated at the intersections between the horizontal and vertical lines of a grid. These discrete dots may be "black or white". To produce a vector of origin ($X_i$, $Y_i$) and components M and N, it is necessary to construct a sub-series P of the dots of the series $\epsilon$ so as to suggest to a viewer the existence of a line segment between the dots ($X_i$, $Y_i$) and ($X_i$+M, $Y_i$+N).

Figure 4:
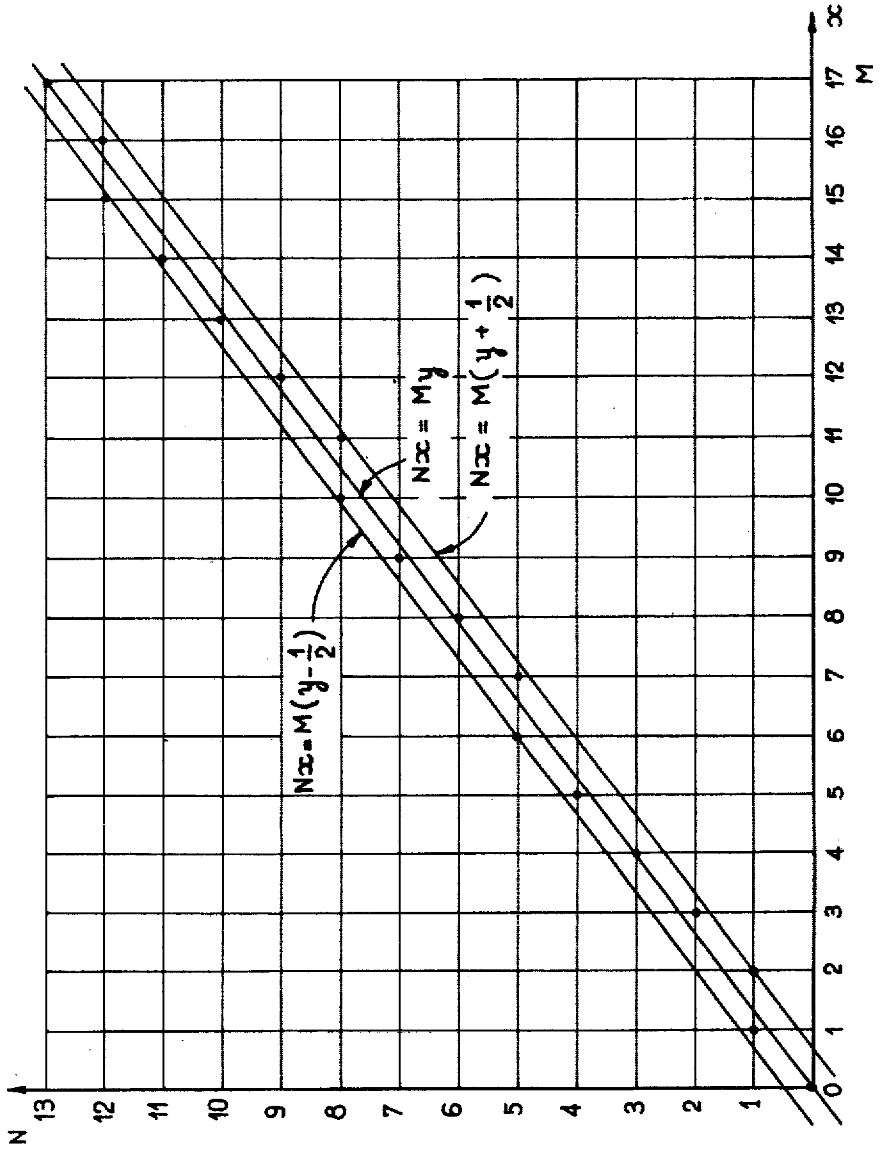
FIG. 4 shows the space in which a vector is drawn.

FIG. 4 shows the equation N.x=My of the line to be approached. A vector will be represented by a series of dots, each of the dots being situated on each vertical line at a distance from the theoretical line of less than or equal to half the mesh size of the grid. Where two dots are situated at a distance of half the mesh size of the grid above and below, only the upper point will be retained and all the points thus recorded to represent a line segment will be situated in the space comprised between the two equation lines:

$$\begin{cases} N \cdot x = M(y - \tfrac{1}{2}) \\ N \cdot x = M(y + \tfrac{1}{2}) \end{cases}$$

In the particular case illustrated, M=17 and N=13.

The vector generator is shown in the form of a highly simplified diagram in FIG. 5*a*. The generator is an processor of which the input data are the M and N projections of the vector along the X and Y axes, respectively, of the graphic image. More exactly, the values M and N are supplied in the form |M| and |N| and their associated direction. The generator produces incrementation signals CK.Y and CK.X of the X and Y registers of the writing pointer and a signal $\overline{\text{IMWE}}$ for validating the input (WE) during a writing operation in the image memory 20.

The generator operates under the control of a clock signal CKIN. Its operation is enabled by a control signal CMD.VECT. and is conditional upon a signal GUWE for validating a vector drawing operation.

The generator enables long vectors VECT. and short vectors VECT.S and also vectors of preferential direction to be drawn. In the case of the VECT. vectors, the values |M| and |N| and their associated signals ARG. are separately specified. For example, |M| and |N| are each specified by one bit of an 8-bit byte, whilst ARG is specified by the three least significant bits of one control word of a byte, so that on the one hand $$-255 \leq M \leq 255$$

$$-255 \leq N \leq 255$$

whilst, on the other hand, 8 directions are available, as shown in FIG. 6*a* and set out in the associated Table in FIG. 6*b*. This method of representation gives the quadrant in which the vector is situated and, optionally, directions 0, 2, 4 and 6 in which one of the components of the vector has a zero component. In cases where the vectors to be drawn are parallel to the axes or to the bisectors of the graphic image, special code words (cf. Table 1) H'18' to H'1F' enable only a single value M or N to be taken into account, in which case the projections of the vectors are selected equal in the two directions X and Y in accordance with the condition |M|=|N|=sup.((reg. |M|, reg. |N|), for example |M|=50 units and |N|=100 units, the code word H'18' (direction 0) enabling a vector of length 100 to be drawn parallel to the X axis of the graphic image.

In the case of short vectors VECT.S, they are specified in a byte in the format indicated in FIG. 6*c*, i.e.

$$|M| \leq 3 \text{ and } |N| \leq 3$$

The code words of these short vectors VECT.S are H'80' to H'FF' and are shown in Table 1. The code words of the long vectors VECT are H'10' to H'17'. By specifying the various types of vectors in this way, it is possible to minimize the quantity of information required for describing a graphic image composed of lines.

The drawing of the vectors may be punctuated. To this end, two bits specifying the nature of the line are available in a control register CNTRL.REGIST., for example:

code 00—continuous line code 01—dotted line (1 dot alight, 1 dot extinguished)

code 10—chain line (2 dots alight, 2 dots extinguished)

code 11—mixed line (10 dots alight, 2 dots extinguished, 2 dots alight, 2 dots extinguished).

The means for forming non-continuous lines is always positioned in the same way for a given vector at the beginning of a drawing operation, which ensures that the erasing of a punctuated vector is alway possible without being continuously imposed, on condition however that the direction in which the vector is drawn is identical.

The vector generators shown in FIG. 5*a* may be divided into two parts, as shown in FIG. 5*b* where $f_{in}$ is the frequency of the clock signal CKIN and $f_x$ and $f_y$ are the output frequencies of the signals for incrementing and decrementing the X and Y registers of the writing pointer. The two blocks A and B are discrete frequency multipliers for multiplying the input frequency $f_{in}$ by a factor $$\frac{P}{K}\ (P \leq K).$$

Accordingly, the following relations exist:

$$f_x = \frac{M}{K} f_{in}$$

$$f_y = \frac{N}{K} f_{in}$$

$$K \geq sup\ (M \cdot N)$$

or in a parametric form of the time variable 't'

$$Y = Y_i + tf_y = Y_i + t\frac{N}{K} f_{in}$$

$$X = X_i + tf_x = X_i + t\frac{M}{K} f_{in}$$

$$0 \leq t \leq KTo \quad \text{To} = {}^1/f_{in}$$

The drawing of a vector occupies K periods of the clock signal CKIN. The various possible vector generators differ from one another in the construction of the discrete frequency multiplier and in the number of clock periods required for drawing a vector of given length.

FIG. 7 shows the principal elements associated with the vector generator:

- a control register (CNTRL.REGIST.) which contains the control words enabling in particular the type of lines and the way in which the data of the "marking or erasing" vector are recorded to be controlled;
- an instruction register (CMD.REGIST) which contains the instruction words and, in particular, the words which specify the starting of the vectors to be drawn;
- data registers: a register |M| VECT.REGIST which contains the value of the component of the vector along the X axis of the graphic image and a register |N| VECT.REGIST which contains the value of the component of the vector along the Y axis of the graphic image;
- a two-way data bus MPDB connected to the various registers;
- an address bus MPAB and its means for decoding the address words.

The vector generator is controlled by a clock signal CKIN and a signal GUWE supplied by the control unit for authorizing the drawing of a vector.

The vector generator delivers the following control signals to the X and Y registers of the writing pointer:

EN.X, EN.Y, U/D.X, U/D.Y and the clock signal CKIN; and delivers to the image memory 20 a signal IMWE for validating a writing operation.

It delivers to the control unit CPU a signal (VGBY) indicating the periods during which the generator is "busy".

A first type of multiplier suitable for use in accordance with the invention is the discrete multiplier better known commercially as a binary rate multiplier or BRM in short. The circuit diagram of a BRM is shown in FIG. 8. A BRM comprises a synchronous counter of "b" sections (bits) with the condition that $K = 2^b = \max(M,N)$, a logic means formed by b logic gates of the AND type. In the illustrated example of a BRM (4 bits), the less significant bits of the counter are on the right and those with the value N on the left. Only the component of order 2 of the output signal is indicated. The outputs of the "AND" gates are added by a logic gate of the "OR" type. If the $I^{th}$ bit of N is at a level "1", i.e. each time the stage of order (b−i−1) of the counter passes to the level "1", a pulse is produced at the output of the multiplier. Since a stage of order $\alpha$ of the counter operates at a frequency $f_{in}/2^{\alpha+1}$, this means that the $I^{th}$ bit of N validates an output at the frequency $$f_{in}/2^{b-1} = f_{in}\frac{2^i}{2^b}$$

Accordingly, the frequency $N/2^b$ is broken down into base 2.

The time required to obtain N impulses at the output of the multiplier is independent of N and is equal to $2^b$.To with ($To=1/f_{in}$), so that $K=2^b=\max(M,N)$.

The chronogram of the signals for the case where N=6 is shown in FIG. 9*a* in which the content of the counter is given opposite the reference CNT. It can be seen that the output pulses of the BRM are distributed very unequally.

Another type of discrete frequency multiplier which enables the pulses to be more evenly distributed than the BRM is the "N-tuple" counter which has the property of incrementing by N units with each of the periods of the input clock. The symbolic diagram of an N-tuple counter is shown in FIG. 10*a*. The output D represents the overflow of the counter. It is at the "high" level if $(m+N)\neq(m+N)$ modulo $2^b$ where m is the value of the preceding content and b is the number of sections (bits) of the counter.

As shown in FIG. 10*b*, an N-tuple counter may be formed by associating a non-transparent register 1, a full adder 2 and a logic gate 3 of the "AND" type, the register and the adder comprising b sections. The overflow D, in this case the carry-over of the adder, occurs N times more frequently than the carry-over or overflow of a conventional counter comprising the same number of sections b; i.e.

$$f_{out} = \frac{N}{2^b} f_{in}$$

and a number of pulses equal to $2^b$ at the input is necessary for obtaining N output pulses. If q is the quotient of $2^b$ by N, the number of clock periods CK between two consecutive output pulses can only be q or q+1 units. The output pulses have the best possible distribution as a function of time, taking into account the fact that, in a discrete frequency multiplier, an output pulse is necessarily aligned in time with an input pulse.

If the N-tuple counter, more precisely the register of the counter, is initialized with the value 'o', the first output pulse will occur at the $q^{th}$ or $(q+1)^{th}$ clock pulse and, given the periodicity of $2^b$To of a sequence of N output pulses, the $N^{th}$ output pulse will coincide exactly with the $2_b{}^{th}$ clock pulse, as indicated by the chronogram shown in FIG. 9*b*. The output pulses will better "balanced" if the register is initialized with the value $2^{b-1}$, as indicated by the chronogram shown in FIG. 9*c*. In FIGS. 9*b* and 9*c*, the number of sections of the counter is b=4 and the value N=6. The content of the register is indicated in hexadecimal notation opposite the reference REG.

Another multiplier is the "one-uple" modulo M counter shown in symbolic form in FIG. 11. The modulo M counter counts for example from the value −M to the value −1. To this end, it is sufficient to load the counter to the value −M when the output state −1 (output carry) is recognized. The output carry occurs M times less frequently than the clock signal CK, i.e.

$$f_{out} = \frac{1}{M} f_{in}$$

If the properties of the N-tuple counter and the modulo M are combined, it is possible to form a modulo M N-tuple counter, as shown in FIG. 12. This counter is used for obtaining $$f_y = \frac{N}{M} f_{in} \text{ with } 0 \leq M \leq 2^b$$
$$f_x = f_{in} \text{ and } N \leq M$$

Accordingly, K is equal to M instead of $2^b$ in the case of the BRM or the N-tuple counter on its own.

Accordingly, it is necessary to produce a counter which increments from the value −M to the value −1 in steps of N which means that N has to perform the function which devolved to $K=2^b$ in the case of the N-tuple counter; now, this value comes into play during overflowing, because at this moment the value effectively added to the content of the register is $N-2^b$. Accordingly, N−M units have to be added. Now, since an overrun occurs in this case, $2^b$ units are lost, so that it is necessary to add exactly $N-M+2^b=(N-M)$ modulo $2^b$ because $N\leq M$.

The values m of the register such as $-2^b<m<-M$ are forbidden, so that it is advisable not to initialize the register to any of these values. From the preceding comment regarding the initialization of the N-tuple counter and by analogy, the register may advantageously be initialized to the value −M/2 (because the rounding-off errors can at worst only shift the output pulses by one clock period CK).

In order to form a modulo M N-tuple counter, a multiplexer 4 has been introduced between the input of the adder 2 and the input data N and (N−M) modulo $2^b$. If the addition of the value N creates an overflow, the addition of the value (N−M) modulo $2^b$ will create an overflow with greater reason, because (N−M) mod $2^b=N-M+2^b$ since $N\leq M$. Now, $N-M+2^b\geq N$ since N $2^b$. However, if the addition of N does not create an overflow, it may happen that the addition of N−M will produce an overflow, this state being stable without being the expected state. On the other hand, from the physical point of view, the adder-multiplexer loop is unstable.

These two factors mean that a non-transparent flip-flop has to be introduced at the output of the adder, as shown in FIG. 13*a*. Each period CK of the clock will comprise the following phases:

forcing the input control of the multiplexer to zero,
sampling the possible overflow of the adder,
allowing this sample value to control the multiplexer,
finally, sampling the output of the adder in the register.

The wave forms of the signals associated with the arrangement are shown in FIG. 13*b*.

If M and N are the cartesian components X, Y of a vector situated in the first octant, it may be verified that the arrangement which has just been described enables quasi-perfect vectors to be drawn, because there is never any incrementation along 'y' without incrementation along 'x'. For each clock period, a new dot of the vector is produced with the result that the rate at which the vector is drawn is optimal. However, it can also be shown that all the dots of the drawn vector are situated in the space defined by:

$$Nx \geqq M(y-\tfrac{1}{2})$$

$$Nx < M(y+\tfrac{1}{2})$$

In addition, since the gaps between the segments along the y axis differ by at most one increment along the x axis, the remark made in reference to the value of the initialization shows that the segments of the ends are half these gaps (to one unit), which enables two identical vectors to be correctly linked, as shown in FIG. 14.

At this stage of the description, the arrangement does not comprise any means for determining the phase of the drawing operation (length of the drawn vector). The arrangement thus formed enables a straight line of slope N/M to be drawn. One way of stopping the arrangement after M pulses is to add a counter which increments from the starting value −M to the stopping value −1 (by one unit at a time). Another way is to use the value of X accessible in the X register of the writing pointer. In the practical case, the X origin of the vector is not zero which would necessitate recording the initial value $X_i$, adding the value M and comparing this result with the running value X.

Thus far, the description has been concerned with the drawing of a vector situated in the first octant. It is now intended to describe the means which enable a vector to be drawn on all the octants. Referring to FIG. 13*a*, it can be seen that the inputs of the multiplexer may be inverted and that the output signals may be directed towards the X and Y registers of the writing point according to the order of the values M and N. This solution requires a comparator for comparing the values M and N, of which the output signal controls multiplexers arranged at the inputs and outputs of the arrangement. In a variant, however, it is possible by replacing all the values of the arrangement shown in FIG. 10*b* by their opposite values and by permutating the values M and N to form a modulo N M-tuple counter (M<N). In this case, the content of the register is comprised between the values 0 and N−1 and an output pulse is generated in the absence of an overflow, as indicated in the diagram shown in FIG. 15. All the foregoing observations may readily be transposed. In particular, the initialization of the register has to be the value N/2. The stop test is carried out by an additional counter which decrements from the value N to the value 1 during drawing and, for the reason mentioned above, a trigger has to be introduced at the output of the adder. In this case, the arrangement has the circuit diagram shown in FIG. 16.

It is possible to combine the arrangements shown in FIGS. 13*a* and 16 to form a single arrangement as shown in FIG. 17. The multiplexer 4 becomes a three-input multiplexer. FIG. 17 shows a second adder 6 which effects the operation (N−M) mod.$2^b$. To this end, the value N is applied to the input 1 of this adder and the value $\overline{M}$ to the input 2, the carry at the output S thus representing N≧M. This output carry controls the most significant bit (MSB) of the multiplexer 4, the less significant (LSB) of the multiplexer being controlled by the output of a second multiplexer formed by the elements 7, 8 and 9. In cases where the controls of the multiplexer are at the level "11", the output S of the multiplexer 4 is $\overline{M}$ and not −M, so that one unit has to be re-added to the input $C_{in}$ of the adder 2 through the logic gate 10 of the "AND" type. The complete symmetrisation of the arrangement is obtained by adding the gates 11 and 12 for directing the output signals to the gates 13 and 14 of the "OR" type.

The intializing operations of the arrangement are as follows:

if N≦M, the value −M is loaded into a stop test counter of the up count type and into the register 1, after which this register is shifted to the right by forcing the most significant bit to the value '1' (division by 2);

if M≦N, the value N is loaded into a stop test counter of the down count type and into the register 1, after which this register is shifted to the right by forcing the most significant bit of this register to the value '0'; which may be achieved in the following manner: in addition to the register 1, the output of the adder 2 will load a counter of the up/down type; the control D/$\overline{U}$ of this counter will be the output (N≧M) of the adder 6.

The initializing sequence of the arrangement will be as follows:

(a) forcing the register 1 to the content '0'

(b) forcing the two controls of the multiplexer 4 to an identical value, namely ($\overline{N \geqq M}$), (c) loading the output of the adder 2 into the register 1 and the stop test counter, (d) shifting the register 1 to the right by one step by forcing the most significant bit to the value ($\overline{N \geqq M}$).

If there is used:

a register 1 having a "synchronous clearing" input, a register 1 and a stop test counter of the up/down type having a "synchronous loading" input, the signals controlling an initializing operation will be those shown in FIG. 18*b* in which:

the reference A corresponds to the forcing of the multiplexer;

the reference B corresponds to the clearing of the register (priority control);

the reference C corresponds to the loading of the up/down stop test counter;

the reference D corresponds to the shifting and loading of the register.

In this case, four phases are involved, namely:

the phase O which corresponds to an inactive or rest phase of the arrangement during which the content of the register is arbitrary;

the initializing phase 1 of which the duration is equal to one period CKIN of the clock, at the beginning of which the content of the register is cleared to the value zero;

the initializing phase 2 of which the duration is equal to 1 period CKIN of the clock at the beginning of which the register is loaded;

the phase 3 or the effective drawing phase of a vector, during which the outputs CK.X and CK.Y of the arrangement are validated.

The initializing sequence may be generated by an arrangement formed by an additional 2-bit counter, as shown in FIG. 18*a*. The counter 20 is incremented at its input CK by the clock signal CKIN, its operation being enabled by the presence of a control signal (CMD.VECT).

The operation of the arrangement is governed by a signal (GUWE) which authorizes a drawing operation. The output E is used for validating the up/down stop test counter. The output B is used for clearing the content of the register. The output C is used for loading up/down stop test counter. The output D is used for loading and shifting the register. The output A is used for forcing the multiplexer. The recognition of the states (−1 and UP) or (1 and DOWN) of the up/down stop test counter will result in "synchronous clearing" of the counter 20 at the terminal CL. In practice, the state (1 and DOWN) of a counter is difficult to recognise and it is simpler to make the counter evolve from N to O and from (−M−1) to −1 by incrementing it by one clock period during the second initializing phase during which the outputs CK.X and CK.Y of the arrangement are not validated. To this end, the up/down stop test counter has to be initialized to the value (−M−1) when N≦M, in other words the input carry of the adder 2 has to be avoided during the initializing phase. The output F state of the counter 20 in the '11' state may be used for validating the outputs CK.X and CK.Y of the arrangement. The output G provides for a signal (VG.BY) indicating that the vector generator is busy.

It was decided to validate the up/down stop test counter during the initializing phases 2 and 3 so that it is possible during phase 2 and during the first period of phase 3 to write into the image memory at the address of the origin of the vector because the first active fronts at the outputs CK.X and CK.Y occur at the end of the first period of phase 3. The validation of the up/down stop test counter during phase 2 of the initializing operation has an advantage in cases where it is desired to draw a vector for which N=M=0, whereas from phase 2 the up/down stop test counter will be loaded to the value N=0. The state (0 and DOWN) will be recognised, resulting in clearing of the counter 20. Thus, there will be a direct transition from phase 2 to phase 0 after the address dot ($X_i$, $Y_i$) has been marked in the image memory during phase 2.

In general, if $\underline{m}$ is sup. (|M|, |N|), the duration of phase 3 is $\underline{m}$ To and the total drawing time of a vector is ($\underline{m}$+3) To, counting from the moment of activation by the signal CMD.VECT.

The observations which have just been made regarding the initializing operations enable the modulo M N-tuple counter to be completed in accordance with the diagram shown in FIG. 19. The up/down stop test counter is denoted by the reference 15. It receives: the validation signal E and the loading signal C produced by the initialization stage, the output signals of the adder 2 at its input D and the counting direction signal at its input D/U. At its output R, it delivers a stop signal H which enables the initialization stage to be reset to zero. The register 1 receives the clearing signal B at its input CL and the loading and shifting signal D at its input L/S. The addition of the multiplexer 16 enables the two controls of the multiplexer 4 to be forced to the same value as indicated above. It receives the control signal A which at the same time is applied to a third input of the logic gate 10 of the 'AND' type. The counter 15, the register 1 and the D-type trigger circuit 5 receive at an input EN the signal GUWE which authorizes a vector drawing operation. It is pointed out that it is not strictly necessary to apply this signal GUWE to the trigger circuit 5, although this does enable the power consumption of the arrangement to be reduced by preventing the multiplexer 4 and the adder from operating continuously in the absence of a drawing operation.

To be complete, the vector generator requires other means in addition to the modulo M N-tuple counter and the activation and initialization circuit which have just been described: means for identifying the direction of the vector, means for drawing normal vectors VECT, short vector VECT.S or vectors having a preferential direction and means for punctuating the drawing of a vector.

The length (number of bits) of the components of the vector generator is governed by the maximal value of the M and N components of the vectors $$0 \leqq |N| \leqq 255$$

$$0 \leqq |M| \leqq 255$$

which fixes the length of these components to 8 bits.

The input data of the vector generator are not M and N as hitherto considered, but |M| and |N|, the signs of these values being specified on 3 bits of a code word. The writing part of the vector generator only takes into account the values |M| and |N|, the signs of these values being taken into account by the registers X and Y of the writing pointer.

The bits which specify the direction (ARG) of the vectors are the least significant bits of a words recorded in the instruction register (CMD REGIST). They are decoded by a decoding circuit 30 shown in FIG. 20. The bit of order 2 directly specifies the counting direction of the Y register of the writing pointer, the decoder comprising the elements 31, 32 and 30 for forming the signal which specifies the counting direction of the X register of the writing pointer.

As will be explained hereinafter, the control signals $\overline{E.X}$ and $\overline{E.Y}$ enable the outputs of the writing part to be validated and the possibly zero values of the quantities M and N to be taken into account. Thus, assuming it is desired to draw a vector of direction 2:ARG (M=0 and N>0) and that the contents of the registers |N| REGIST and |M| REGIST are, respectively, 5 and 100, the X register of the writing pointer will not be incremented. However, the writing part which receives the data |M| and |N| will detect that |M|≧|N| and will deliver 5 increments in the Y direction distributed over 100 periods of the clock. In order in this case to accelerate the drawing speed, the input |M| of the generator has to be forced to the level zero, but not when it is desired to draw a "preferential direction" vector because in that case there have to be 100 incrementations along the Y axis, as mentioned at the beginning of the description.

The means for producing the input data |N| and |M| of the writing part of the vector generator are shown in FIG. 21. As mentioned above in reference to FIG. 20, the bits ARG (vector direction codes) are decoded by the decoding circuit 30. The data |M| and |N| are available in two registers 70 and 71 and the data corresponding to a short vector VECT.S are available in an 8 bit byte in the instruction register CMD.REGIST.72. Depending on the type of vectors to be drawn, namely VECT. or VECT.S, the registers M, N or the register CMD are selected by the multiplexers 73 and 74 for an instruction $\overline{\text{VECT.S}}$ at the lower level.

One means for punctuating the drawing of the lines is shown in FIG. 22a. It comprises a counter 60 having 4 sections (bits) and a multiplexer 61 having 4 inputs and 1 output. The multiplexer is controlled by 2 bits of the control words contained in the CNTRL.REGIST, a logic gate 62 of the "OR" type of which the inputs are connected to the sections of order 1 and 3 (B and D). The chronogram of the signals for obtaining the three types of punctuation is shown in FIG. 22*b*. The counter 60 may be reinitialized by the input CL (clearing) during one of the initialization phases of the drawing of a vector which ensures that the punctuation of the lines begins by an identical sequence with each drawing operation of a vector.

It should be pointed out at this juncture that this counter 60 is used in conjunction with the counter 15 shown in FIG. 19 of which the four less significant outputs may be used. In this case, two different vectors do not necessarily begin by the same sequence of dotted lines, although it is certain that one and the same vector will always begin by the same sequence, this being sufficient to ensure that a given figure will always be able to be erased by being redrawn after modification of the recording mode from 'marking' to 'erasing'. FIG. 23 shows the addition of the multiplexer 61 to the stop test counter 15 of the vector generator. The output S of the multiplexer is applied to a first input of a logic gate 63 of the 'AND' type which, in addition, receives the validation signal GUWE and the signal E of the counter 15.

FIG. 24 shows the vector generator as a whole in the form of a logic diagram. It is pointed out that, since the X and Y registers of the writing pointer are of the synchronous type controlled by the clock signal CKIN, the outputs of the vector generator are not CK.X and CK.Y, but EN.X and EN.Y, i.e. associated with the registers X REGIST and Y REGIST. All the elements of the generator controlled by the clock signal CKIN receive the writing authorization signal GUWE to enable their operation to be stopped outside writing periods.

FIG. 25 shows in the form of a circuit diagram one embodiment of the vector generator using standard MSI (medium-scale integrated circuit) packages and SSI (small-scale integrated circuit) packages:

- the register 1 is formed by 2 LS 195 packages,
- the adder 2 is formed by 2 LS 283 packages,
- the sampling flip-flop 5 is formed by 1 LS 74 packages,
- the stop counter 15 is formed by 2 LS 169 packages,
- the punctuating multiplexer 61 is formed by 1 LS 153 packages,
- the multiplexer 8 is formed by 4 LS 153 packages,
- the multiplexer 16 is formed by 1 LS 157 packages,
- the adder 6 is formed by 2 LS 283 packages,
- the initializing stage is formed by 1 LS 163 packages,
- the multiplexers 73 and 74 are each formed by half an LS 157 packages.

FIG. 26 shows one embodiment of the registers for storing the M and N components of the vectors which uses the following packages:

- the register M REGIST is formed by 2 LS 175 packages
- the register N is formed by 2 LS 175 packages
- the three-state buffer enabling the data to be recorded and the content of these registers to be read are formed by 2 DM 8097 modules.

In addition to the advantages already mentioned, the invention as described in the foregoing has the advantage that it can be produced by MOS (metal-oxide-semiconductor) technology with very large scale integration (VLSI) and the advantage of being able to draw a graphic image at high speed because one dot of the vector is drawn with each clock period . . . corresponds the construction of one dot of the graphic image, disregarding the short time set aside for initializing the generator.

The invention is by no means limited to the embodiment described above and may comprise other variants. In particular, the values of the parameters M and N may be modified, the formats of the control and data words may be different and the direction codes of the vectors may be adapted to the way in which the vectors are represented in the control unit.

The invention may be used in various graphic image display systems and in particular in consoles equipped with a cathode ray storage tube, in plasma screens etc. and also in X, Y plotters.

I claim:

1. A digital generator for digitally drawing dotted oriented line segment of predetermined length on a set of continuous grid points, the elements of said line segment, in digital form, being: the components M and N comprising respectively the projections of the segment on orthogonal X and Y axes; the direction of the segment; the type of vector to be drawn; the type of line to be drawn; characterised in that said vector generator comprises:

- a data bus;
- an address bus;
- means connected to said data bus for forming the dots of the segment comprising: a discrete frequency multiplier for multiplying the frequency of a clock signal by a factor N/M, starting means for enabling said dot forming means and stopping means for terminating said dot forming means;
- means for identifying the relative order of the parameters M and N;
- means for initializing said dot forming means;
- first and second registers connected to the data bus and to the address bus for storing data words which specify the values of the parameters M and N;
- a register connected to the data bus and to the address for storing an instruction word which specifies the direction of the segment and the type of segment to be drawn;
- a register connected to the data bus and to the address bus for storing a control word which specifies the type of line to be drawn;
- a writing pointer comprising two registers, namely an X register and a Y register respectively corresponding to the X and Y axes and connected to said dot forming means; and
- means for punctuating the drawing of a segment.

2. A generator as claimed in claim 1, characterised in that the discrete frequency multiplier comprises:

- a register having a clock input, a loading/shifting input, a clearing input, a data input and a data input;
- an adder having two data inputs, one carry input, one data output and one carry output;
- a multiplexer having two control inputs, three data inputs and one data output; and
- a sampling trigger having one clock input, one data input and one data output, the data output of said adder being connected to a first data input of said register; the data output of said register being connected to a second data input of said adder, the carry output of said adder being connected to the data input of the sampling trigger.

3. A generator as claimed in claim 1, characterised in that the means for stopping the discrete frequency multiplier comprises a synchronous up/down counter having an activation input, a clock input, a loading input, a counting direction input and a carry output.

4. A vector generator as claimed in claim 1, characterised in that the means for punctuating the drawing of a segment comprises a synchronous counter wherein the outputs thereof are connected through a logic means to a multiplexer having four inputs and one output controlled by the digital data corresponding to the type of line segment to be drawn.

5. A vector generator as claimed in claim 1 or claim 3, characterised in that the means for punctuating the drawing of a segment comprises of means for connecting the least significant outputs of the stopping counter through a logic means to a multiplexer having four inputs and one output controlled by the digital data corresponding to the type of line to be drawn.

6. A generator as claimed in claim 1, characterised in that the initializing means comprises a two-bit, synchronous counter having a validation input, a release input and a clearing input the two outputs of said counter being applied to an "OR" gate of which the output indicates the current state of the vector generator.

7. A generator as claimed in claim 1, characterised in that the means for identifying the respective orders of the parameters M and N comprises an adder having two data inputs, the first input receiving the value N and the second input receiving the complemented value N.

* * * * *